United States Patent
Kuranuki

(10) Patent No.: US 7,206,949 B2
(45) Date of Patent: Apr. 17, 2007

(54) SYSTEM AND METHOD FOR CONTROLLING A CLOCK OSCILLATOR AND POWER SUPPLY VOLTAGE BASED ON THE ENERGY CONSUMED FOR PROCESSING A PREDETERMINED AMOUNT OF DATA

(75) Inventor: Masaaki Kuranuki, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 335 days.

(21) Appl. No.: 10/801,714

(22) Filed: Mar. 17, 2004

(65) Prior Publication Data

US 2004/0193929 A1    Sep. 30, 2004

(30) Foreign Application Priority Data

Mar. 18, 2003    (JP) ............................. 2003-073838

(51) Int. Cl.
*G06F 1/00*    (2006.01)
*G06F 1/32*    (2006.01)

(52) U.S. Cl. ...................... 713/320; 713/322; 713/340

(58) Field of Classification Search ................ 713/320, 713/312, 340, 322
See application file for complete search history.

(56) References Cited

U.S. PATENT DOCUMENTS

| | | | |
|---|---|---|---|
| 5,453,904 A | 9/1995 | Higashiyama et al. | |
| 6,154,374 A | 11/2000 | Uejima et al. | |
| 6,215,287 B1 | 4/2001 | Matsushiro et al. | |
| 6,704,876 B1* | 3/2004 | Iacobovici et al. | 713/300 |
| 6,795,927 B1* | 9/2004 | Altmejd et al. | 713/300 |
| 6,940,359 B2* | 9/2005 | Ishii | 331/185 |
| 7,058,824 B2* | 6/2006 | Plante et al. | 713/300 |
| 2003/0115239 A1 | 6/2003 | Togawa | |
| 2004/0010726 A1 | 1/2004 | Motegi et al. | |

FOREIGN PATENT DOCUMENTS

| | | |
|---|---|---|
| CN | 1394308 | 1/2001 |
| JP | 2001-517332 | 10/2001 |
| JP | 2002-543513 | 12/2002 |
| WO | 97/12329 | 4/1997 |
| WO | 00/67102 | 11/2000 |
| WO | 02/27450 | 4/2002 |

* cited by examiner

*Primary Examiner*—Thomas C. Lee
*Assistant Examiner*—Mark Connolly
(74) *Attorney, Agent, or Firm*—Greenblum & Bernstein, P.L.C.

(57) ABSTRACT

A processor capable of reducing power consumption of an electronic information device sends a frequency control signal to a clock oscillator, operates at a frequency in accordance with the frequency control signal. Further, the processor sends a voltage request signal to a power supply circuit, and operates at a voltage in accordance with the voltage request signal. The processor controls the supplied clock frequency and power supply voltage so that the processor itself operates in an operation area in which energy consumption becomes minimum for a predetermined amount of data. Such an operation area is defined by a clock frequency, a power supply voltage, and power supply efficiency ($\eta$) of the power supply circuit.

15 Claims, 9 Drawing Sheets

Fig.5

51 SET VALUE TABLE

| MODE | CLOCK FREQUENCY (f) | POWER SUPPLY VOLTAGE ($V_{DD}$) |
|---|---|---|
| HIGH-SPEED OPERATION MODE | 400 | 1.3 |
| OPTIMUM POWER MODE | 200 | 1.1 |
| LOW POWER MODE | 133 | 0.935 |
| SLEEP MODE | (133) | (0.935) |

55 SET VALUE TABLE FOR OPTIMUM POWER MODE

| TEMPERATURE (T) | CLOCK FREQUENCY (f) | POWER SUPPLY VOLTAGE ($V_{DD}$) |
|---|---|---|
| $T_1$ | $f_1$ | $V_{DD1}$ |
| $T_2$ | $f_2$ | $V_{DD2}$ |
| ⋮ | ⋮ | ⋮ |
| $T_n$ | $f_n$ | $V_{DDn}$ |

SYSTEM AND METHOD FOR CONTROLLING A CLOCK OSCILLATOR AND POWER SUPPLY VOLTAGE BASED ON THE ENERGY CONSUMED FOR PROCESSING A PREDETERMINED AMOUNT OF DATA

BACKGROUND OF THE INVENTION

1. Technical Field

The present invention relates to a low power consumption technology in a processor having a low power consumption operation mode, and in an information processing device having the processor incorporated therein.

2. Related Art

In late years, in the field of an electronic information device and a portable information processing device, in addition to improvement of a processing ability of a processor to be used for these devices, it is important to reduce an power consumption of the processor, particularly, in a technical field of a portable information processing device.

Reduction of the power consumption is generally achieved by controlling a frequency of a clock supplied to the processor, and controlling supply of a power supply voltage (for example, refer to a patent document 1: JP-A-2001-517332 and a patent document 2: JP-A-2002-543513). As a driving mode of a conventional processor, a low power operation mode is provided, and an power consumption of the processor is made lower than that of a normal operation mode (i.e., a non-low power operation mode) so as to lower the power consumption of processor alone. In other words, in the conventional low power consumption mode, a clock frequency and a power supply voltage to be supplied to the processor is controlled so that the power consumption of one processor, namely, a calorific value of the processor is made small.

As described above, the conventional low power consumption mode focuses attention on the power consumption per unit time of the processor. However, from a view point of a battery drain, electric energy to be consumed in total in terms of time should be considered. That is, the amount of power consumed to complete a predetermined amount of process should be considered, and in this case, the conventional low power consumption mode does not always realize the low power consumption operation.

In the case of driving a processor in the conventional power consumption mode, it is true that the power consumption per unit time in the processor is reduced. However, in this case, since the power supply efficiency is decreased and the processing ability of the processor is lowered, it takes a longer time to complete a predetermined amount of process, and an expended time of the battery is increased. Therefore, even if the power per unit time is reduced, it takes a longer time to complete one process, and this does not consistently results in that the power consumption in its entirety (i.e., the power consumption per time×time for processing) is reduced. In other words, if a ratio of increase of the processing time by the low power consumption mode exceeds a ratio of decrease in the power consumption in the low power consumption mode, from a view point of the battery consumption, this results in increase in the power consumption in its entirety.

DISCLOSURE OF THE INVENTION

The present invention has been made taking the foregoing problems into consideration and an object of which is to provide a processor, which truly reduces power consumption of a battery, a driving method thereof, and an electric information device provided with such a processor.

A processor according to the invention operates at a frequency of a clock signal supplied from a clock oscillator and with a power supply voltage supplied from a power supply circuit and is capable of controlling the frequency of the clock signal and the power supply voltage. The processor controls the frequency supplied from the clock oscillator and the power supply voltage supplied from the power supply circuit so that energy consumption to process a predetermined amount of data takes a value within a predetermined range including a minimum value of the energy consumption. The energy consumption is defined by the frequency, the power supply voltage, and power supply efficiency of the power supply circuit.

The processor may include a section that calculates the energy consumption to process a predetermined amount of data on the basis of the frequency, the power supply voltage, and the power supply efficiency of the power supply circuit, and a controller that controls the frequency supplied from the clock oscillator and the power supply voltage supplied from the power supply circuit so that the energy consumption takes a value within a predetermined range including a minimum value of the energy consumption.

The processor may include a storage section that stores a table storing the energy consumption which is defined by the frequency, the power supply voltage, and the power supply efficiency of the power supply circuit, and data process related to the energy consumption, and a controller that controls a frequency supplied from the clock oscillator and a power supply voltage supplied from the power supply circuit on the basis of the table in the storage section so that the energy consumption takes a value within a predetermined range including a minimum value of the energy consumption.

The processor may have a first operation mode and a second operation mode which is different from the first operation mode. In the first operation mode, the frequency supplied from the clock oscillator and a power supply voltage supplied from the power supply circuit may be set so that the energy consumption which is defined by the frequency, the power supply voltage and the power supply efficiency of the power supply circuit, takes a value within a predetermined range including a minimum value of the energy consumption.

The processor may monitor a state of a battery which is connected to the power supply circuit to change the operation mode in accordance with the state of the battery.

The processor may change the frequency and the power supply voltage to be set in the first operation mode according to temperature of the power supply circuit.

The processor may operate in the first operation mode only when carrying out a predetermined process including at least one of a download process, a displaying process of a still picture, and a recording process of an image.

An electronic information device according to the invention is provided with a clock oscillator, a power supply circuit, and the processor according to the invention.

A method according to the invention is for driving a processor which operates at a frequency of a clock signal to be supplied from a clock oscillator and with a power supply voltage to be supplied from a power supply circuit, and is capable of controlling the frequency of the clock signal and the power supply voltage. The method includes controlling the frequency supplied from the clock oscillator and the power supply voltage supplied from the power supply circuit, so that energy consumption to process a predetermined amount of data takes a minimum value of the energy consumption or a value within a predetermined range including the minimum value. The energy consumption is defined by the frequency, the power supply voltage, and power supply efficiency of the power supply circuit.

(Effects of the Invention)

According to the present invention, an operational area having a small energy consumption for a process (a unit process) to a predetermined amount of data is defined by a frequency, a voltage, and power supply efficiency of a power supply, and a processor is driven to execute process in this operational area. Thus, as compared to a technology of lowering an power consumption only of the processor, it is possible to reduce the power consumption of an electronic information device. As a result, for example, the present invention can obtains an advantage so as to make a battery survival time longer. This advantage is especially prominent in a portable information processing device, which is supplied with energy from the battery without being directly coupled to a commercial power supply.

BRIEF DESCRIPTION OF THE DRAWINGS

FIG. 3 is a graph indicating a relation between a clock frequency and each calculated value of energy consumption or the like.

FIG. 5 shows an example of a set value table.

BEST MODES FOR CARRYING OUT THE INVENTION

Figure 1:
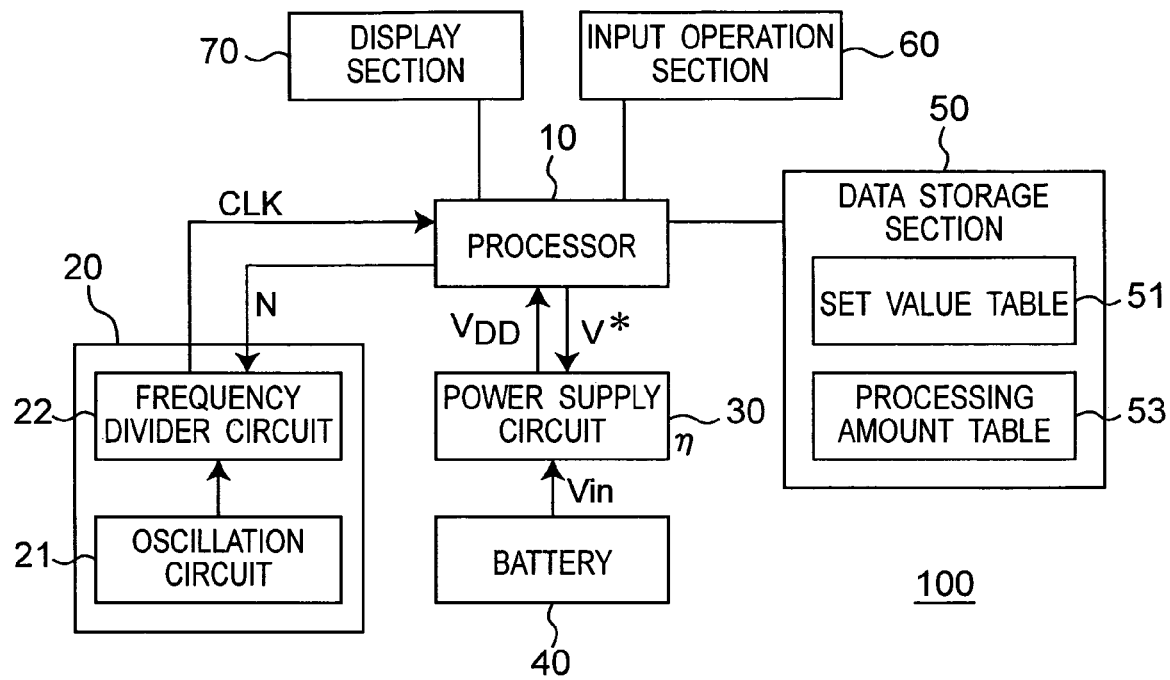
FIG. 1 shows a structure of an electronic information device according to the present invention.

With reference to the drawings, embodiments of a processor and a driving method of the processor according the present invention will be described below. In the drawings, constitutional elements having substantially identical functions are given the identical reference numerals.

(Embodiment 1)

FIG. 1 shows a structure of an electronic information device according to a first embodiment of the present invention. An electronic information device 100 according to the present embodiment is provided with a processor 10, a clock oscillator 20, a power supply circuit 30, a data storage section 50, and an input operation section 60, and a display section 70.

The processor 10 is an arithmetic processing unit such as a CPU or the like, and outputs a frequency control signal to the clock oscillator 20. The clock oscillator 20 outputs a clock signal of a frequency in accordance with the frequency control signal to the processor 10. The processor 10 operates (is driven) at the frequency of the clock signal as an operation frequency. In other words, the processor 10 typically operates at the frequency of the frequency control signal. In addition, the processor 10 outputs a voltage request signal to the power supply circuit 30. The power supply circuit 30 outputs a voltage in response to the voltage request signal, and the processor 10 operates at an output voltage from the power supply circuit 30 as a driving voltage. The processor 10 can change at least one of the clock frequency and the power supply voltage during the operation.

The clock oscillator 20 is configured by an oscillation circuit 21 and a frequency divider circuit 22, and the clock oscillator 20 changes the frequency of an output clock signal CLK on the basis of the frequency control signal received from the processor 10. The frequency divider circuit 22 outputs a clock signal obtained by dividing a frequency of the oscillation circuit 21 with a frequency dividing ratio N given from the processor. The divider circuit 22, for example, converts a cycle of the clock signal from the oscillation circuit 21 into a ½ cycle (N=2) and a ¼ cycle (N=4). In the present embodiment, the frequency control signal provides the frequency dividing ratio N according to the requested frequency. Further, a voltage controlled oscillator (VCO) varying a frequency linearly may be used without using the divider circuit 22.

The data storage section 50 may store various parameters to be used by the processor 10 for controlling the power source supply. More specifically, the data storage section 50 stores a set value table 51 and a processing amount table 53. The set value table 51 stores set values for the clock frequency and power supply voltage of the processor 10 in accordance with various operation modes. The processing amount table 53 is a table relating a command to be executed by the processor 10 with amount of the corresponding process (a load amount).

The input operation section 60 is means by which a user of the electronic information device 100 inputs the information and the instruction, such as a keyboard, a key pad, and a mouse or the like. The display section 70 indicates information such as a character and an image or the like.

The power supply circuit 30 generates a voltage on the basis of a voltage request signal (V*) from the processor 10, and applies it to the processor 10 as a power supply voltage VDD. Accordingly, the processor 10 operates at a voltage of the voltage request signal (V*). If the electronic information device 100 is a portable information processing device (for example, a notebook computer, a cellular telephone, and a PDA or the like), the power supply circuit 30 is electrically connected to a battery 40 and supplies energy from this battery 40.

Figure 2:
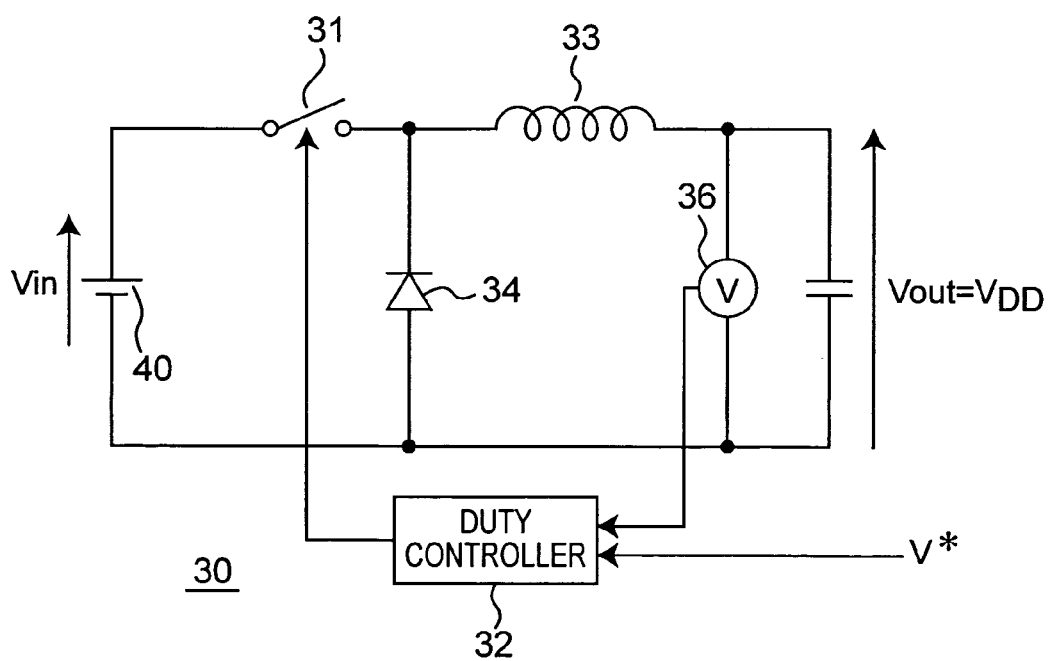
FIG. 2 shows a structure of a power supply circuit.

FIG. 2 shows a structure of the power supply circuit 30. The power supply circuit 30 is provided with a switching element 31, a duty controller 32, an inductor 33, a diode 34 and a capacitor 35. The duty controller 32 is configured by, for example, an IC, and the switching element is, for example, a FET. The power supply circuit 30 is a DC/DC converter, and it converts a constant voltage (Vin) to be supplied from the battery 40 into a voltage (Vout) in response to the voltage request signal (V*) from the processor 10. In this case, the switching element 31 is typically a transistor (FET). The duty controller 32 receives the voltage request signal (V*) from the processor 10, detects a Vout through a voltage detector 36, and turns ON/OFF the switching element 31 so that the output voltage (Vout) becomes a requested voltage.

A loss (an efficiency ($\eta$)) in the power supply circuit 30 will be described below. The loss in the power supply circuit 30 is roughly divided into a fixed loss, and a loss to be generated by a load current. For example, the fixed loss includes a driving loss of the switching element to be generated upon driving the switching element 31, and a loss by consumption at the duty controller 32. On the other hand, for example, the loss to be generated by the load current includes a conduction loss of the switching element 31, a conduction loss of the inductor 33, and a loss by a forward voltage drop of the diode 34. There is a steady value of the fixed loss, so that even if the output of the power supply circuit 30 is made zero, due to the fixed loss, the entire loss does not become zero. In other words, if the power consumption is intended to be minimum only by the processor 10, in the operation of the power supply circuit 30 at a light load, as compared to the operation of the power supply circuit 30 at a heavy load, an occupation ratio of the fixed loss in the entire loss due to the fixed loss is made larger, and this results in that the low efficiency of power supply circuit 30 at the light load may affect the consumption power in the entire device. In other words, when considering reduction of the power consumption in the entire device, it is necessary that, in consideration of the power supply efficiency of the power supply circuit 30, the processor 10 should be operated in an area having the substantially minimum energy consumption.

A concept of the low power consumption operation according to the present embodiment will be described below.

In a conventional low power consumption operation only paying attention to the structure around the processor 10, the clock frequency and the power supply voltage (only a frequency depending on circumstances) are controlled so that the consumption power is made small for the process given to the processor 10. In other words, the clock frequency and the power supply voltage are controlled so as to minimize heat generation of the processor. However, when considering the processor 10 as a load in view of the merit of the battery, the power supply circuit 30 is not ideal and has a certain power supply efficiency $\eta$, and thus the loss of the power supply circuit 30 should be considered so as to extend the battery survival time. In other words, it is preferable that the frequency and the voltage are set such that the power consumption of both of the power supply circuit 30 and the processor 10 are made small.

An inventor of the present invention did a trial calculation of power consumption, a current from the battery 40, and a sum (power consumption) of supplied power from the battery 40 when a predetermined amount of data process is carried out by using a certain processor (here, Xscale made by Intel Corporation). This result is indicated as follows.

TABLE 1

| Power supply voltage ($V_{DD}$ [V]) | clock frequency (f [MHz]) | power consumption ($fV^2_{DD}$) | power supply efficiency ($\eta$ [%]) | battery current ($fV^2_{DD}/\eta$) | processing time (400/f) | energy consumption (400 $V^2_{DD}/\eta$) |
|---|---|---|---|---|---|---|
| 1.3 | 400 | 676 | 90 | 751 | 1 | 751 |
| 1.1 | 200 | 242 | 70 | 346 | 2 | 691 |
| 0.935 | 133 | 116 (relative value) | 40 | 291 (relative value) | 3 (relative value) | 872 = battery current × processing time (relative value) |

In the table 1, the values of the power consumption, the battery current, the processing time, and the energy consumption are represented by the relative values of which certain coefficient is omitted as a matter of convenience of the explanation. In the table 1, the power supply voltage (VDD) and the clock frequency (f) are decided depending on a specification of the processor 10, and they correspond one to one. The power consumption is obtained as $fV^2$ from the driving voltage (VDD) and the clock frequency (f). In addition, the power supply efficiency ($\eta$) of the power supply circuit 30 is decided depending on the specification of the power supply circuit 30 in response to the power supply voltage (VDD) and the clock frequency (f). It is possible to represent a value of the battery current by $fV^2/\eta$.

Figure 3:
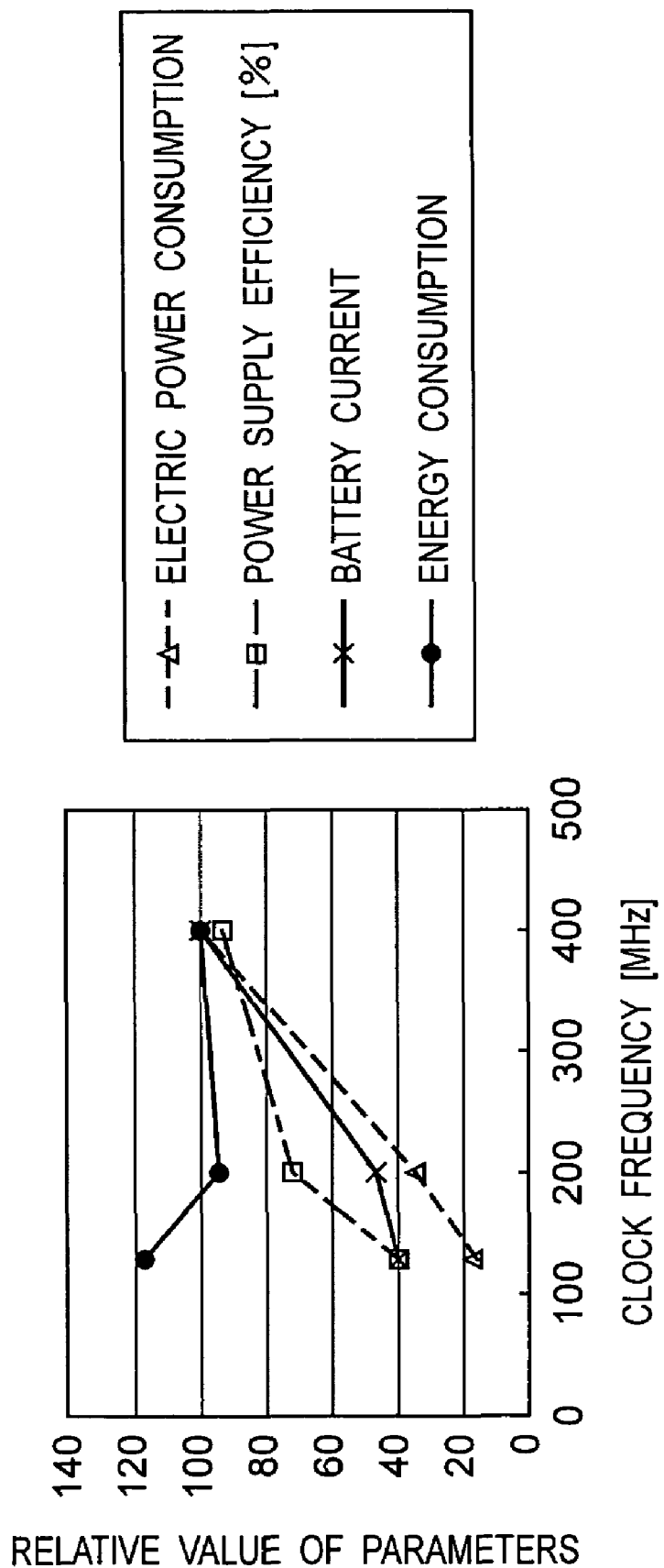

In this case, the processing time generated due to a difference of the frequency is obtained as 400/f. Further, a value of the processing time is represented by a relative value obtained by normalization on the basis of the processing time when the driving voltage is 1.3 (V). The energy consumption is calculated as a product of the battery current and the processing time (the relative value). FIG. 3 shows a relation of the table 1 in a plot.

As shown in FIG. 3, even though the clock frequency (f is controlled to the lowest level (133 MHz) attempting to reduce the power consumption of the processor 10, the energy consumption is not minimized. This is due to the influence of the power supply efficiency ($\eta$). In the operation at the second-lowest clock frequency (200 MHz), the lowest value of the energy consumption is indicated. According to the conventional method, the frequency is controlled to minimum so as to reduce the power consumption. However, as shown in the drawing, it is understood that there is a case that the energy consumption is not minimized by such a control method.

Therefore, according to the present embodiment, an operational point where the energy consumption becomes the minimum is found, and an operation mode ("optimum operation mode") that drives the processor 10 at the operational point or in a certain operation area including the operational point is provided. In this operation mode, the power consumption of processor 10 alone is not always the minimum, however, the energy consumption also considering the efficiency of the power supply circuit 30 can be reduced more than the case that the frequency is merely the minimum, in view of a processing ability of the processor 10.

That is, according the electronic information device of the present embodiment, the processor 10 drives at the above-described operational point or in the operational area including the operational point. In other words, the processor 10 is provided with a function for performing the arithmetic process in the operational area in which the energy consumption becomes the minimum or minimal for a unit data process. In this case, the energy consumption to a unit data process is defined by the frequency (CLK), the voltage (V), and the power supply efficiency (η) owned by the power supply circuit 30. It is noted that the "unit data process" means a unit of process for processing a predetermined or constant amount of data, so that if the clock frequency is made higher, the process is terminated earlier, and on the other hand, if the clock frequency is made lower, the process is terminated late.

Figure 4A:
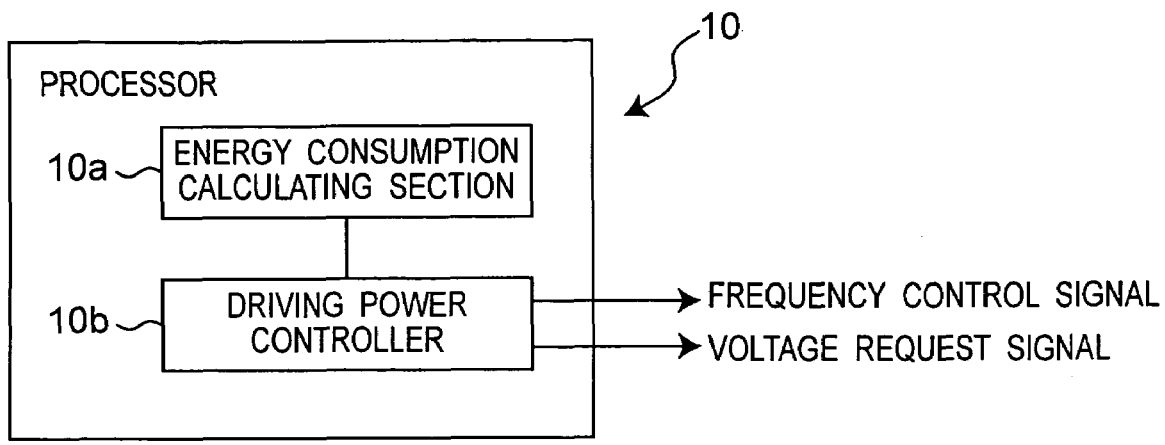
FIG. 4A is a view explaining a function of a processor.

FIG. 4A shows an example of the structure to make the processor 10 realize such a function. The processor 10 is provided with an energy consumption calculating section 10a and a driving power controller 10b. The energy consumption calculating section 10a calculates the energy consumption for the unit data process from the clock frequency, the power supply voltage, and the power supply efficiency with respect to various clock frequencies. The driving power controller 10b determines from the calculated result the operational area (that is, the frequency and the power supply voltage) in which the energy consumption becomes minimum for the unit data process, generates and outputs a frequency control signal and a voltage request signal so as to drive the processor 10 in the obtained operational area (in FIG. 3, 200 (MHz), 1.1 (V)). Here, "operational area in which the energy consumption becomes minimum" typically means an operational point where the calculated "energy consumption for the unit data process" is minimal (or minimum), or a predetermined area including the operational point. For example, it means an area at a minimal point±(the frequency at the minimal point×25% (preferably, 10%)). According to the example shown in FIG. 3, for example, it means an area of 200 MHz±50 Mz (preferably, 200 MHz±20 Mz).

Figure 4B:
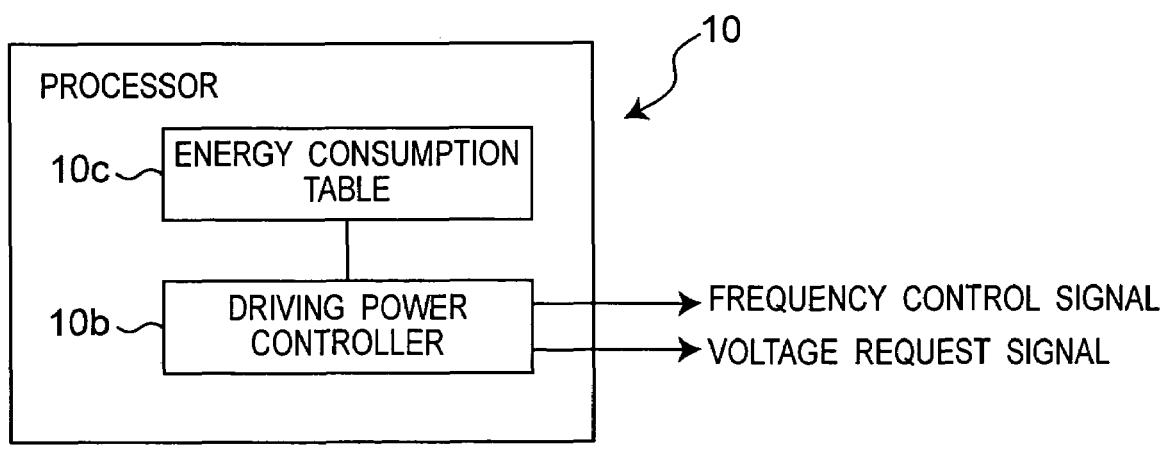
FIG. 4B is a view explaining the other function of a processor.

In addition, if the electronic information device is a portable information processing device such as a cellular phone, the operation of the arithmetic process is limited to predetermined operational patterns in many cases. Therefore, the processor 10, as shown in FIG. 4B, may have a table 10c relating its operational pattern with the energy consumption to the operational pattern. The table 10c may be stored in a storage unit that is provided outside of the processor 10. Then, a driving power controller 10b of the processor 10 may generate a frequency control signal and a voltage request signal so as to set the clock frequency and the power supply voltage in accordance with the energy consumption with reference to the table 10c while monitoring the operational pattern of the electronic information device. More specifically, for one operational pattern not requesting a high-speed process, the processor 10 may be driven at an optimum power mode in which the energy consumption becomes minimum, and for the other operational pattern, the processor 10 may be driven at a high-speed mode.

(Embodiment 2)

The electronic information device according to the present embodiment is a processor of controlling the power, which is described according to the first embodiment, and further is provided with a processor having four operation modes related to the power consumption.

At first, the operation mode will be described below. The processor 10 according to the present embodiment has four operation modes, that is, "high-speed operation mode", "optimum power mode", "low power mode", and "sleep mode". Respective operation modes are switched on the basis of a balance between the request of the low consumption power and the processing ability to be requested.

"High-Speed Operation Mode"

This mode is a driving mode for bringing out the ability of the processor 10 sufficiently, in which the processor 10 is driven at a higher frequency and a higher power supply voltage as compared to other modes. Therefore, the power consumption becomes larger. At a large process amount, this mode is used. According to the example shown in the table 1 and FIG. 3, the processor 10 is driven at a clock frequency 400 (MHz) and a driving voltage 1.3 (V).

"Optimum Power Mode"

The optimum power mode is an operation mode to keep the consumption of the battery 40 lowest in consideration of the power consumption in both of the processor 10 and the power supply circuit 30. More specifically, in the present mode, the processor 10 is driven at the power area decided by the clock frequency, the power supply voltage, and the efficiency of the power supply circuit, where the consumption power becomes the lowest. According to the examples shown in the table 1 and FIG. 3, the processor 10 is driven at a clock frequency 200 (MHz) and a driving voltage 1.1 (V), where the energy consumption becomes minimum.

"Low Power Mode"

This mode is used under the standby state for the process to be performed (for example, a command standby state). This mode serves to drive the processor 10 at the clock frequency and the power supply voltage that are lower than the optimum power mode. According to the examples shown in the table 1 and FIG. 3, the processor 10 is driven at a clock frequency 133 (MHz) and a driving voltage 0.935 (V).

"Sleep Mode"

This mode is an operation mode while the processor 10 is in a sleep state, where an instant value of the energy consumption becomes the minimum. The clock frequency and the power supply voltage are identical those in the low power mode. This mode is achieved by carrying out the low power mode intermittently.

FIG. 5 shows an example of set values for the clock frequency and the power supply voltage in each mode, which are stored in the set value table 51.

Figure 6:
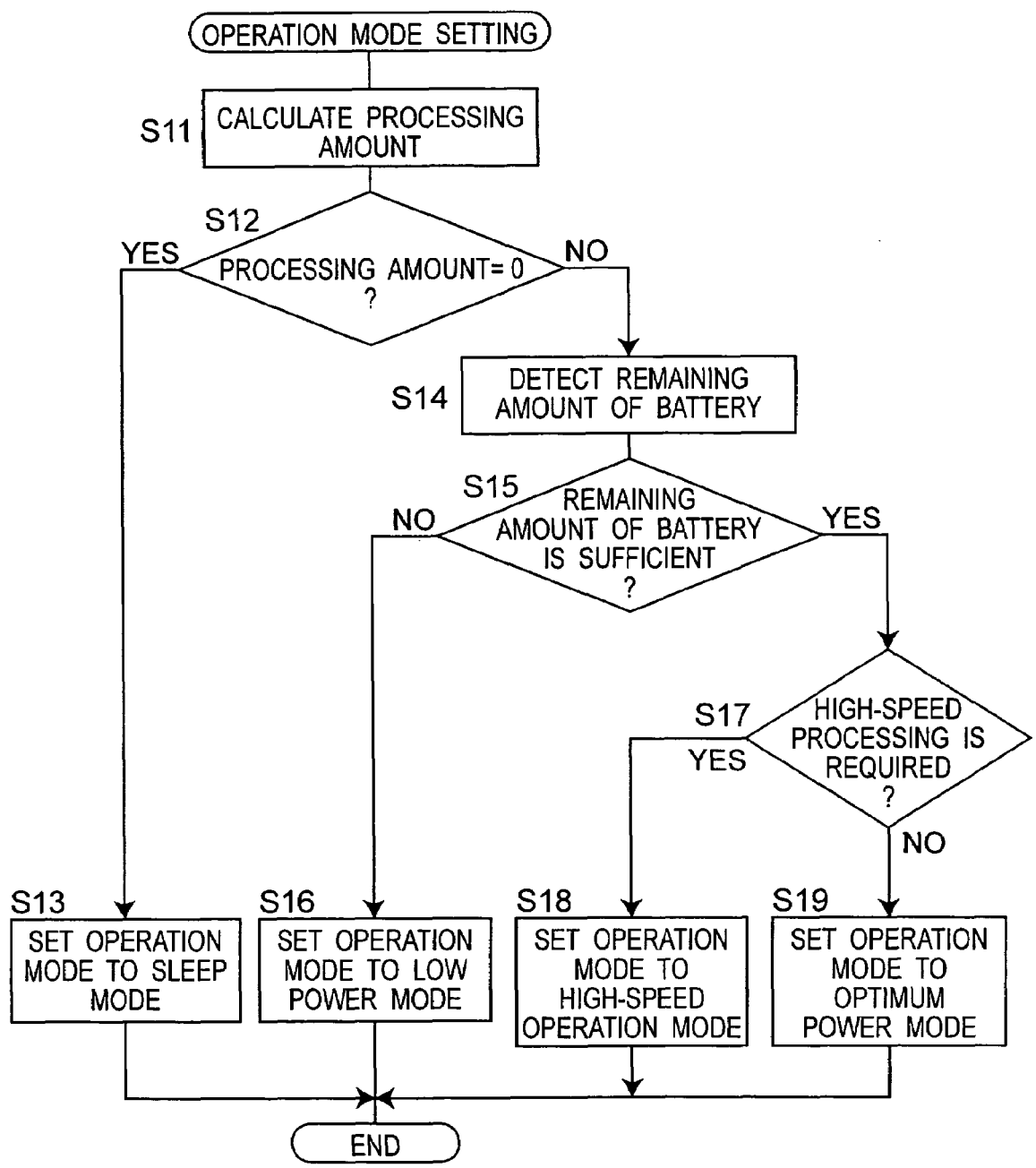
FIG. 6 is a flow chart of operation mode setting process.

With reference to a flow chart shown in FIG. 6, the setting process of the operation mode by the processor 10 will be described below. The present process is periodically performed at a predetermined cycle.

At first, the processing amount to be processed by the processor 10 is determined (S11). For example, the processing amount (the load amount) for a command to be processed is obtained with reference to the processing amount table 53 for the command to be processed. Next, it is determined if the processing amount is zero or not (S12), and if it is zero, the operation mode is set to a sleep mode (S13).

When the processing amount is not zero, by detecting the voltage of the battery 40, and detecting, its remaining amount (S14), it is determined if the remaining amount of the battery 40 is sufficient or not (S15).

Figure 7:
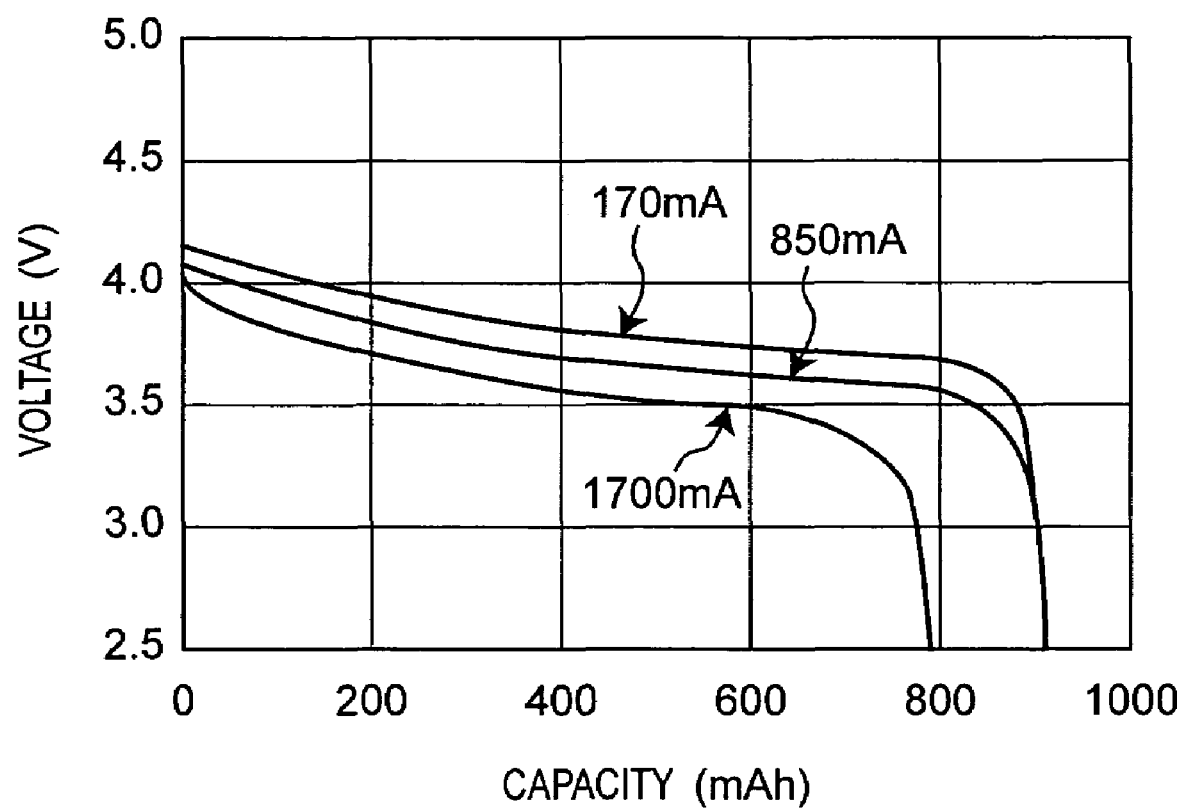
FIG. 7 is a graph showing an example of a relation between a dischargeable capacity and a voltage for each discharge current of a battery.

If the remaining amount is not sufficient (it is less than a predetermined quantity), the operation mode is set to the low power mode which drives the processor 10 at a low power supply voltage (S16). The reason for setting the low power mode is that in that case the remaining amount of the battery 40 is less and the battery 40 cannot supply a high power supply voltage. FIG. 7 is a graph showing a general relation between a remaining amount and a current which can be brought out from a battery (a discharging current). In FIG. 7, the discharging condition includes a fixed current and 20° C. As shown in this drawing, since the output voltage of the battery is decided according to the remaining amount of the battery and the discharging current, as described above, it is preferable that the operation mode is set in consideration of the remaining amount of the battery. When the low power mode is set, set values for the clock frequency and power supply voltage for the low power mode are read from the set value table 51.

On the other hand, when the remaining amount is sufficient (not less than the predetermined quantity), it is detected whether a user's instruction requests the high-speed process (S17). If the user's instruction requests the high-speed process, the operation mode is set to the high-speed operation mode (S18), or if not, the operation mode is set to the optimum power mode (S19). The user's instruction is input through the input operation section 60. The reason why the determination whether the operation mode is set to the high-speed operation mode depends on the user's instruction in this way is because it may take a very long time in the optimum power mode if the processing amount is large and thus it is convenient for the user to decide if the consumption of the battery is prioritized or the processing time is prioritized depending on user's will.

Figures 8, 9:
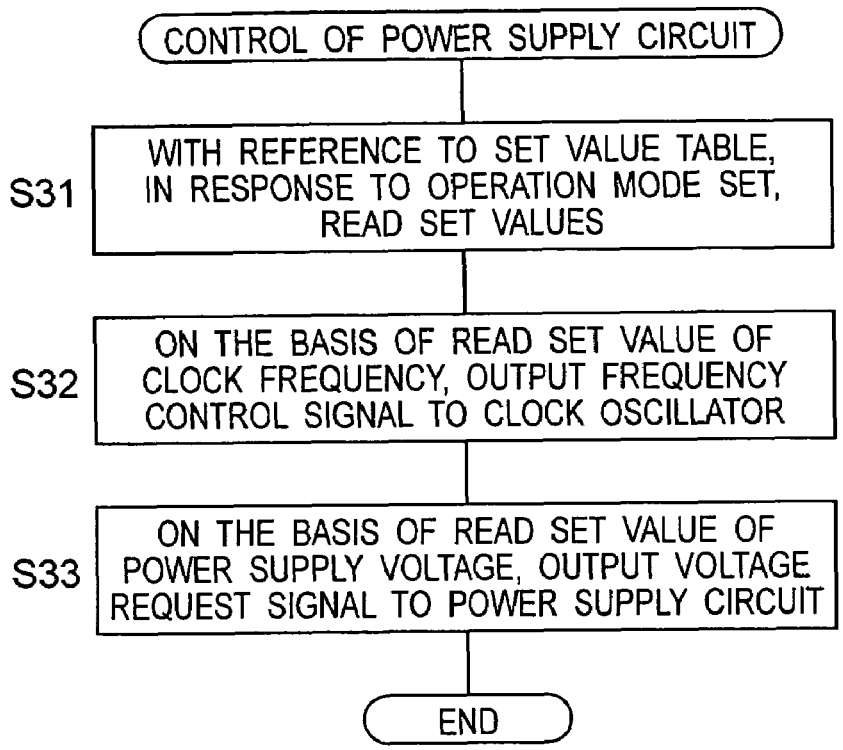
FIG. 8 is a flowchart of control process of a power supply circuit.
FIG. 9 shows an example of a set value table for an optimum power mode.

With reference to a flow chart shown in FIG. 8, the control of the power supply circuit 30 by the processor 10 will be described below. The present process is carried out when the operation mode is newly set or changed.

When the operation mode is set as described above, with reference to the set value table 51, the set values for the clock frequency and the power supply voltage are read out according to the set operation mode (S31). On the basis of the read set value of the clock frequency, a frequency control signal is output to the clock oscillator 20 (S32). Thereby, the clock oscillator 20 outputs a clock signal with a frequency according to the frequency control signal. Further, a voltage request signal is output to the power supply circuit 30 on the basis of the read set value of the power supply voltage (S33). Thereby, the power supply circuit 30 outputs a power supply voltage according to the voltage request signal. The above-described process makes the processor 10 to be driven at the set operation mode.

(Embodiment 3)

According to the above-described embodiments, in consideration of the efficiency η of the power supply circuit 30, the operation mode providing the minimum energy consumption is set. However, it is known that the efficiency η of the power supply circuit 30 is changed in response to an ambient temperature. According to the present embodiment, a method for deciding the set value of the optimum power mode in consideration of change in temperature will be described.

In order to enable the decision of the set value in consideration of change in temperature, a set value table 55 for the optimum power mode is newly provided. The set value table 55 for the optimum power mode is stored in the data storage section 50. The set value table 55 for the optimum power mode manages the temperature of the power supply circuit 30, and set values for the clock frequency and the power supply voltage those providing the minimum point or its vicinity of the energy consumption at that temperature, while relating them with each other. These values have been obtained in advance by an experiment.

Figure 10:
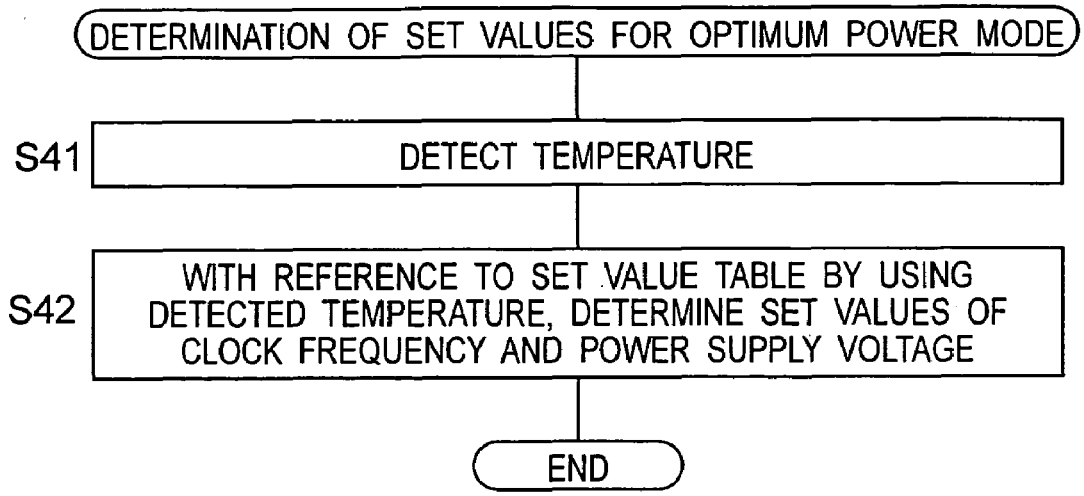
FIG. 10 is a flow chart of determining process of a set value in an optimum power mode.

With reference to a flow chart shown in FIG. 10, the determining process of set values for the optimum power mode in consideration of change in temperature will be described below. At first, the temperature around the power supply circuit 30 is detected by using a temperature detecting device such as a thermistor (S41). Then, with reference to the set value table 55 for the optimum power mode, set values for the clock frequency and the power supply voltage, which are related to the detected temperature, are determined (S42).

As described above, by optimizing set values according to the change in temperature, it becomes possible to set the power mode that is optimum for a real environment. In addition, the above-described optimization of the set values may be carried out when the power supply of the electronic information device is turned on, however, it may be performed periodically or for each appearance of predetermined process.

(Embodiment 4)

With reference to a flow chart shown in FIG. 11, the other example of the determination process of set values for the optimum power mode in consideration of the change in temperature will be described below. Hereinafter, the optimization is carried out on the basis of the operational power of the processor 10, which is measured in practice.

Figure 11:
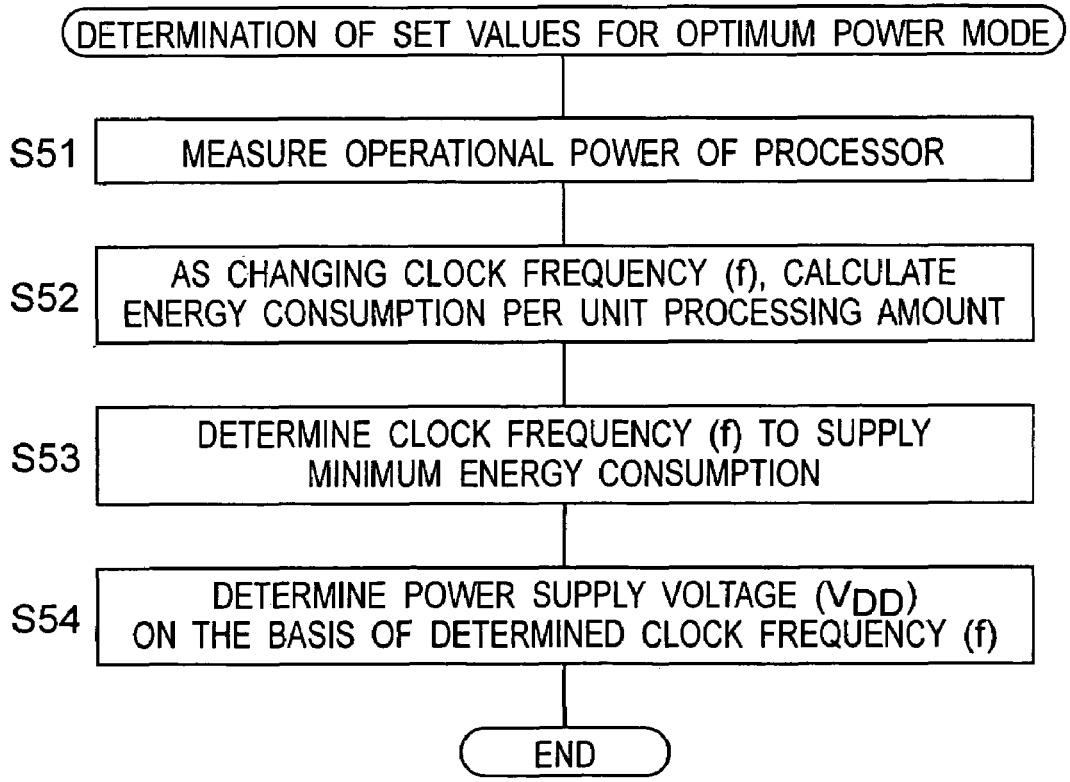
FIG. 11 is a flow chart of other example of the determining process of a set value of an optimum power mode.

In FIG. 11, at first, a power (P) required for operation of the processor 10 is measured (S51). The power P required for operation of the processor 10 can be obtained by the following formula by monitoring, for example, an input voltage Vin and an input current Iin of the power supply circuit 30 supplying the power to the processor 10.

$$P=Vin*Iin$$

Next, as changing the clock frequency (f), energy consumption for unit data process is calculated for a plurality of frequencies by the following formula (S52).

$$\text{Energy consumption for unit data process}=\text{operational power }(P)/\text{clock frequency }(f)$$

From the calculated plural energy consumption values for unit data process, the minimum energy consumption value is specified, and the clock frequency (f) corresponding to the minimum energy consumption value is determined as a set value (S53). On the basis of the determined clock frequency, a set value of the power supply voltage (VDD) is then determined (S54).

(Embodiment 5)

Figure 12:
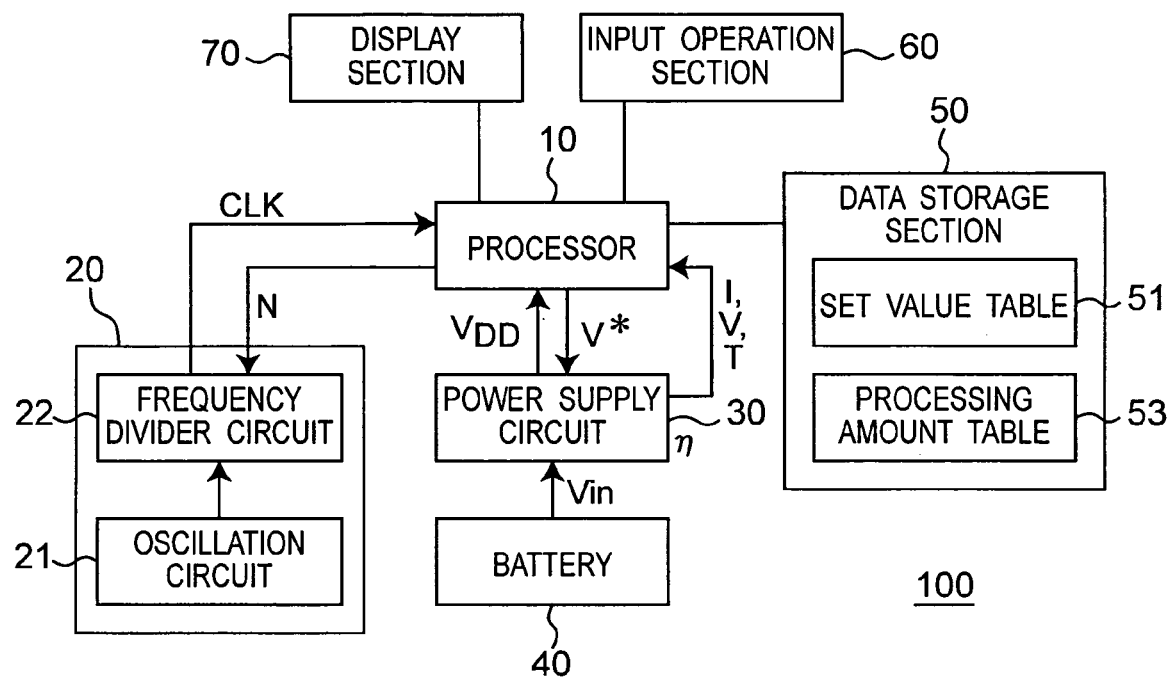
FIG. 12 shows other structure of an electronic information device according to the present invention.

In the electronic information device of the first embodiment, as shown in FIG. 12, the processor 10 may monitor the charging condition of the battery 40 to be connected to the power supply circuit 30. As shown in FIG. 7, the battery 40 has different profiles depending on used conditions (FIG. 7 shows different lines for three currents), so that it is preferable that the processor 10 is operated in consideration of such charging condition of the battery 40. It is possible to examine the charging condition of the battery 40 on the basis of the voltage (V), the current (I), and the temperature (T) of the battery 40. In this time, the processor 10 controls the operation of the processor 10 according to the charging condition of the battery 40.

According to the example shown in FIG. 3, it is preferable that the processor 10 is operated at 200 MHz from a view point of saving of power consumption, however, from a view point of the battery state (in other words, the voltage which can be obtained from the battery state at that time), finding an operative range in consideration of the capacity of the battery 40 (or obtaining it in advance), the processor 10 may be operated at a predetermined frequency in the operative range.

By calculating a discharging current on the basis of the battery current ($fV^2/\eta$) shown in the table 1, and obtaining the capacity (the charging state) (a value on a horizontal axis in FIG. 3) on the basis of the voltage, the current, and the temperature of the battery 40, for example, the maximum voltage can be obtained at that time can be acquired from FIG. 3.

As a result of obtaining the maximum voltage, even while the processor 10 is operating in the optimum power mode, when it cannot be expected to continuously obtain a voltage necessary for the optimum power mode since the charging state of the battery 40 is significantly low, the optimum power mode may be shifted to the low power mode by compulsion.

MODIFIED EXAMPLES

According to the above-described first to fifth embodiments, since the processor 10 is a processor capable of changing at least one of the operational frequency and the driving voltage during operation, not only, the power consumption at a normal level can be reduced, but also, the process by the processor can be carried out in the operational range in which the energy consumption becomes substantively minimum for processing the unit data amount, in consideration of the operational frequency (clock frequency) of the processor, the supply voltage of the processor, and the power supply efficiency of the power supply applying the voltage to the processor. Therefore, it is possible to realize the electronic information device having the less consumption power, which cannot be easily realized by a conventional power saving design paying attention only to the processor.

In the meantime, the process to be carried out in the operational area having the small energy consumption is preferably a non-real time process that is not required to complete the process within a predetermined time (for example, download process, display process of still pictures, and record of photographed images) because, in the real time process that is required to complete the process within a predetermined time (for example, the voice conversation process, display process of moving pictures), if its process is slowed in consideration of the power consumption, some troubles to the process to be performed essentially may be caused due to poor performance.

In addition, in the non-real time process, the processor may be prevented from being driven at the frequency area lower than the frequency at which the energy consumption is substantively minimum (in the example shown in FIG. 3, 200 MHz), and after completion of the process, the state of the CPU may be changed into the sleep mode in which a supply of clock and/or power supply stop/stops.

It is noted that the electronic information device according to the above-described embodiment may include a notebook computer, a cellular telephone, a PDA, a computer, a digital camera, and other information processing device for electrically processing the information, because even power saving of the entire electronic information device coupled to a commercial power supply has an advantage, for example, saving electricity costs. In the portable information processing device incorporating the battery therein and without being coupled to the commercial power supply, the advantage of the present invention is more remarkable.

In addition, the output from the power supply circuit 30 is appropriately set by the electronic information device to use the power supply circuit 30, and for example, the output from the power supply circuit 30 is 1.2 V to 15 V. As the battery 40, a preferable one may be selected in accordance with the electronic information device to use this battery 40. However, ignoring a real problem such as measurements and costs or the like, the types of the battery 40 are not limited in principle if the battery can supply the requested voltage, and it may be a primary battery, a secondary battery, or a fuel battery, or it may be a lithium-ion battery, a Ni-hydrogen battery, an alkali cell, or a manganese battery.

The preferable examples of the present invention are described as above, however, the present invention is not limited to this and it is a matter of course that various modifications are available.

The present invention can be applied to an electronic information device which is provided with a processor capable of controlling a driving frequency and a power supply voltage, and particularly is useful for the electronic information device including a processor to which a power supply voltage is supplied from a power supply having a limited capacity, such as a portable information terminal.

The present disclosure relates to subject matter contained in Japanese Patent Application No. 2003-073838, filed on Mar. 18, 2003, the contents of which are herein expressly incorporated by reference in its entirety.

What is claimed is:

1. A processor which operates at a frequency of a clock signal supplied from a clock oscillator and with a power supply voltage supplied from a power supply circuit, and is capable of controlling the frequency of the clock signal and the power supply voltage, wherein
the processor controls the frequency supplied from the clock oscillator and the power supply voltage supplied from the power supply circuit so that energy consumed by processing a predetermined amount of data is within a predetermined range of a minimum value of energy consumption, the energy consumption being defined by a processing time, the frequency, the power supply voltage, and a power supply efficiency of the power supply circuit.

2. The processor according to claim 1, comprising:
a calculator that calculates the energy consumed by processing the predetermined amount of data on the basis of the frequency, the power supply voltage, and the power supply efficiency of the power supply circuit; and
a controller that controls the frequency supplied from the clock oscillator and the power supply voltage supplied from the power supply circuit so that the energy consumption is within the predetermined range of the minimum value of the energy consumption.

3. An electronic information device, comprising a clock oscillator, a power supply circuit, and the processor according to claim 2.

4. The processor according to claim 1, comprising:
a storage section that stores a table storing an energy consumption value which is defined by a frequency, a power supply voltage, and a power supply efficiency of the power supply circuit, and a data process related to the energy consumption; and a controller that controls a frequency supplied from the clock oscillator and a power supply voltage supplied from the power supply circuit on the basis of the table.

5. An electronic information device, comprising a clock oscillator, a power supply circuit, and the processor according to claim 4.

6. The processor according to claim 1, wherein the processor has a first operation mode and a second operation mode which is different from the first operation mode, and in the first operation mode the frequency supplied from the clock oscillator and a power supply voltage supplied from the power supply circuit are set so that the energy consumed by processing the predetermined amount of data is within a predetermined range of the minimum value of the energy consumption.

7. The processor according to claim 6, wherein the processor monitors a state of a battery which is connected to the power supply circuit to change the operation mode in accordance with the state of the battery.

8. An electronic information device, comprising a clock oscillator, a power supply circuit, and the processor according to claim 7.

9. The processor according to claim 6, wherein the processor changes the frequency and the power supply voltage to be set in the first operation mode according to a temperature of the power supply circuit.

10. An electronic information device, comprising a clock oscillator, a power supply circuit, and the processor according to claim 9.

11. The processor according to claim 6, wherein the processor operates in the first operation mode only when carrying out a predetermined process including at least one of a download process, a displaying process of a still picture, and a recording process of an image.

12. An electronic information device, comprising a clock oscillator, a power supply circuit, and the processor according to claim 11.

13. An electronic information device, comprising a clock oscillator, a power supply circuit, and the processor according to claim 6.

14. An electronic information device, comprising a clock oscillator, a power supply circuit, and the processor according to claim 1.

15. A method for driving a processor which operates at a frequency of a clock signal to be supplied from a clock oscillator and with a power supply voltage to be supplied from a power supply circuit, and is capable of controlling the frequency of the clock signal and the power supply voltage, comprising:

controlling the frequency supplied from the clock oscillator and the power supply voltage supplied from the power supply circuit, so that energy consumed by processing a predetermined amount of data is within a predetermined range of a minimum value of energy consumption, the energy consumption being defined by a processing time, the frequency, the power supply voltage, and power supply efficiency of the power supply circuit.

* * * * *